United States Patent [19]
Fischer et al.

[11] Patent Number: 5,926,326
[45] Date of Patent: Jul. 20, 1999

[54] ARRANGEMENT FOR SECURING COMPONENTS IN AN OPTICAL SYSTEM

[75] Inventors: Andreas Fischer, Berga; Reiner Hofmann, Apolda; Armin Leitel, Jena, all of Germany

[73] Assignee: Carl Zeiss Jena GmbH, Jena, Germany

[21] Appl. No.: 09/000,412

[22] PCT Filed: Jun. 5, 1997

[86] PCT No.: PCT/EP97/02928

§ 371 Date: Feb. 3, 1998

§ 102(e) Date: Feb. 3, 1998

[87] PCT Pub. No.: WO97/48000

PCT Pub. Date: Dec. 18, 1997

[30] Foreign Application Priority Data

Jun. 12, 1996 [DE] Germany .................. 196 23 426

[51] Int. Cl.$^6$ .................................................. G02B 7/02
[52] U.S. Cl. .......................................... 359/819; 359/820
[58] Field of Search .................... 359/819, 820, 359/827, 822

[56] References Cited

U.S. PATENT DOCUMENTS

| | | | |
|---|---|---|---|
| 3,904,276 | 9/1975 | Whitaker et al. | 359/820 |
| 4,136,466 | 1/1979 | Wrue | 359/819 |
| 4,850,674 | 7/1989 | Hasselskog | 359/820 |
| 4,909,599 | 3/1990 | Hanke et al. | 359/819 |
| 5,079,646 | 1/1992 | Schwartz | 359/819 |
| 5,177,641 | 1/1993 | Kobayashi et al. | 359/820 |
| 5,510,935 | 4/1993 | Whitty et al. | 359/822 |
| 5,557,474 | 9/1996 | McCrary | 359/820 |

OTHER PUBLICATIONS

Patent Abstracts of Japan, vol. 009, No. 090 (P–350) Apr. 19, 1985, JP Publication No. 59–218409, Dec. 8, 1994 (Olympus Optical Co., Ltd.).

Primary Examiner—Loha Ben
Attorney, Agent, or Firm—McAulay Nissen Goldberg Kiel & Hand, LLP

[57] ABSTRACT

An arrangement is provided for fixing components of an optical system such as lenses, mounting rings, and the like. The components which are guided radially in the tube are held in the axial direction under pretensioning in an elastic manner. The arrangement is designed for fixing components in the axial direction in which the pretensioning force can be varied in definable steps. This is done by providing that a detachable fastening ring and also the tube have catch elements at concentric circumferential surfaces, which catch elements are constructed as complementing locking elements. Under axially directed force, the catch elements of the fastening ring can be engaged in the catch elements at the tube and the catch elements can be disengaged in the opposite force direction. The pretensioning force which is exerted by the fastening ring on the components to be held depends upon the extent to which the catch elements of the fastening ring and of the tube overlap.

4 Claims, 1 Drawing Sheet

ARRANGEMENT FOR SECURING COMPONENTS IN AN OPTICAL SYSTEM

BACKGROUND OF THE INVENTION a) Field of the Invention

The invention is directed to an arrangement for fixing components of an optical system such as lenses, mounting rings, spacers, and the like which are enclosed by a common tube in which they are guided radially and held in the axial direction under pretensioning in an elastic manner.

b) Description of the Related Art

It is conventional in optical engineering to compensate for thermally induced changes in length of structural component parts within an optical system and deviations in length occurring during manufacture by means of resilient holders with pretensioning in the direction of the optical axis. When the parts are arranged successively axially, a first part generally rests on a fixed support. In the case of the final structural component part, a functional part, e.g., a rubber ring, which is pretensioned in a springing-elastic manner extends over the edge area and fixes the parts in position.

A suggestion of this kind is disclosed in DE OS 29 22 287. In this case, the resilient holder in a mounting for optical lenses is characterized in that a ring of rubber-like material is arranged in an annular groove in the mounting body. The annular groove is partially covered in the axial direction by the circumferential surface of the lens. The space provided for the ring between the lens and mounting body is widened outward. The lens is held as an individual part between a fixed annular stop, which is formed integral with the mounting body, and the rubber ring. For this purpose, the pretensioning force exerted by the elastically deformed rubber ring is transmitted to the mounting body by the annular stop on the one hand and by the contact surface of the rubber ring on the other hand. It is disadvantageous that this solution compensates for changes in length and differences in length only for one structural component part, namely the lens. A further disadvantage consists in that a change in the magnitude of the pretensioning force in defined steps, as is desirable for special optical systems, is not possible in this holder because the position of the rubber ring is permanently fixed by the position of the groove. When no groove is provided (in the case of a frictional connection with the mounting body), the pretensioning force is dependent in any case on the friction between the rubber and the cylindrical wall of the mounting body, which friction is influenced by numerous factors, and consequently can not be changed in a definite manner.

DE OS 23 62 041 describes a mounting in which a lens or lens group is held in its mounting by means of a ring which can be screwed in. The ring has elastic projections which serve as a support for the lens group and hold the latter under elastic pretensioning. In this case, while the magnitude of the pretensioning force can be varied by the depth to which the ring is screwed in, it is disadvantageous that the thread is uneconomical to manufacture and the assembly of the optical system is time-consuming.

Another solution for the elastic support of optical lenses in their mountings is disclosed by DE OS 28 46 241. At least two small plates of resilient material, e.g., metal, which engage over the edge area of the lens are provided at the side of the lens located opposite from the fixed support and are connected in a positive engagement with the mounting, wherein they contact the lens under pretensioning. The springing plates are simply inserted into corresponding openings in the mounting during assembly. This proposal for elastic axial support is likewise disadvantageous in that a defined increase or decrease in the pretensioning force in defined steps is not possible because the position of the small plates is permanently determined in the axial direction by the openings in the mounting.

OBJECT AND SUMMARY OF THE INVENTION

It is the primary object of the invention to provide an arrangement for fixing components of an optical system in the axial direction in which the pretensioning force by which the components are held against a stop in an elastic manner can be varied in determined steps. The arrangement can be manufactured economically and is easy to assemble.

According to the invention, this object is met for components of an optical system which contact a stop axially in a common tube on the one hand and are held against the stop under pretensioning by a detachable fastening ring in a positive engagement with the tube on the other hand in that the fastening ring is made from elastic material and engages radially over the edge area of one of the components. Both the fastening ring and the tube have catch elements at a circumferential surface which is oriented concentric to the optical axis, which catch elements are constructed as complementing locking elements. The catch elements of the fastening ring can be engaged in the catch elements at the tube by application of axially directed force on the fastening ring. The catch elements can be disengaged in the opposite force direction. Due to the fact that the catch elements are distributed surfacewise along the circumference of the fastening ring and tube, a plurality of locking positions are provided in the axial direction so that the pretensioning force exerted by the fastening ring on the components to be held is dependent on the extent to which the catch elements at the fastening ring cover the catch elements at the tube. In other words, the pretensioning force increases with the distance by which the fastening ring is pushed in the direction of the stop and, conversely, decreases as the fastening ring in the locking engagement is moved farther away from the stop.

Of course, a technically equivalent solution can consist in that the tube is manufactured from elastic material instead of the fastening ring or in that both the tube and the fastening ring are made from elastic material. It is essential that the material of one of these two structural component parts can deflect elastically in the radial direction during axial displacement relative to one another.

The catch elements should advantageously be constructed at the respective circumferential surfaces at the fastening ring and tube such that their cross sections have the shape of a ridge-type roof. In so doing, the angle of inclination of the roof-shaped surfaces can differ with respect to the optical axis so that the force required for locking in differs from the force required for detaching the catch connection.

The catch elements at the fastening ring can extend radially along the entire circumference of the respective portion of the circumferential surface; independent from this, the catch elements at the tube can extend over the entire circumference of the respective portion of the circumferential surface.

The invention will be explained hereinafter with reference to an embodiment example.

DESCRIPTION OF THE PREFERRED EMBODIMENTS

Figure 1:
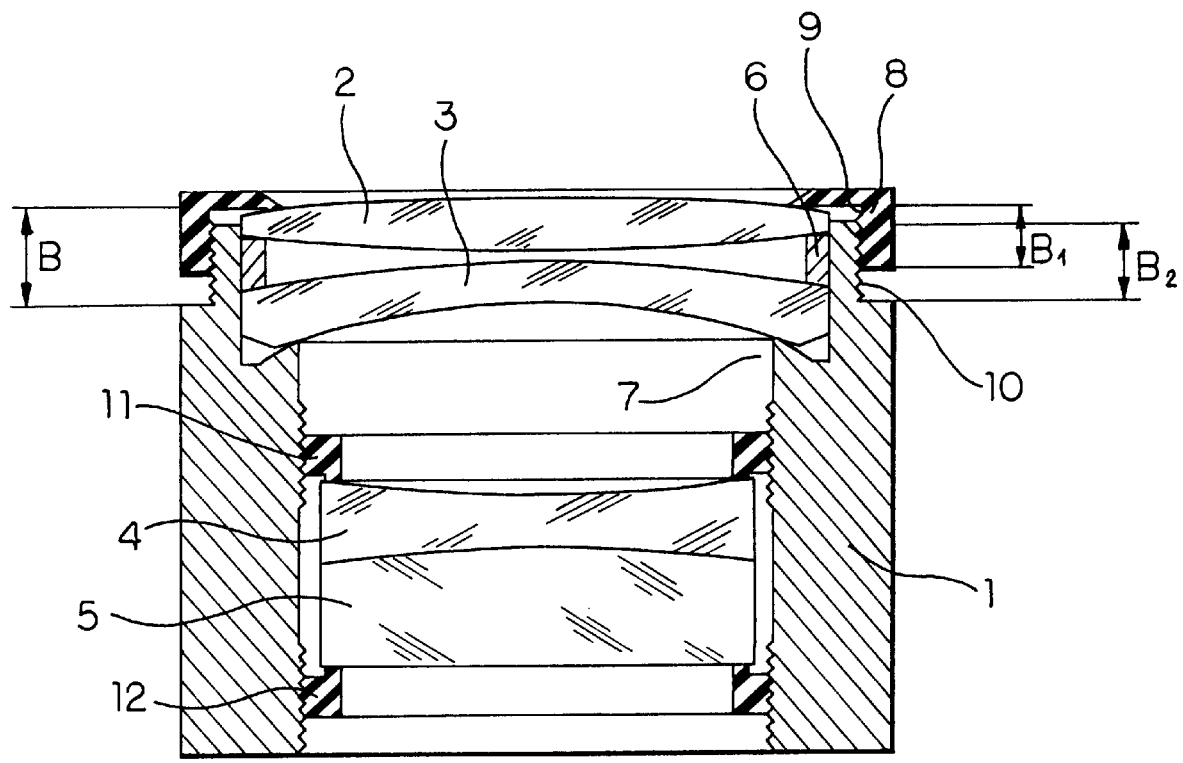
FIG. 1 an optical system with two construction variants of the invention.

FIG. 1 shows an optical system with the tube 1, lenses 2 to 5, and a spacer ring 6. In a first construction variant of the invention, the lenses 2 and 3 and the intermediate ring 6 are arranged in succession axially so as to contact a fixed stop 7 formed integral with the tube 1 on one side and are held against the stop 7 under pretensioning by a detachable fastening ring 8 on the other side. The fastening ring 8 is manufactured from elastic material and engages radially over the rim of the lens 2. Both the fastening ring 8 and the tube 1 have catch elements 9 and 10 at a circumferential surface which is oriented concentric to the optical axis and extends over region B. These catch elements 9 and 10 are constructed as complementing locking elements. Catch elements 9 are distributed in region $B_1$ at the fastening ring 8 along the entire circumferential surface. Catch elements 10 are likewise distributed in region $B_2$ at the tube along the entire circumferential surface so that there is a plurality of catching positions in the axial direction. The quantity of catch positions per unit of length depends on the geometric size of the individual catch elements.

When the fastening ring 8 is displaced in the axial direction toward the stop 7, the elastic catch elements at the fastening ring 8 deflect radially and slide into the next catch position. In so doing, the overlapping of regions $B_1$ and $B_2$ increases, additional catch elements 9, 10 engage and the fastening ring 8 changes its position relative to the stop 7 in a stepwise manner with every further catch position. The step size can be influenced, in terms of construction, by the magnitude of the individual catch elements. Each catch step of the fastening ring 8 in the axial direction toward the stop 7 brings about a defined increase in the pretensioning force which the fastening ring 8 exerts by its inner edge on the component to be held (lens 2, spacer ring 6, lens 3). Conversely, every catch step by which the fastening ring 8 is displaced in the axial direction away from the stop 7 means a defined reduction in the pretensioning force.

In a second construction variant of the invention (FIG. 1), the lenses 4 and 5 contact both sides of the fastening rings 11 and 12. The fastening rings 11 and 12 are likewise manufactured from an elastic material and engage with their inner diameters radially over the rim of the lens 4 or 5 facing them. The fastening rings 11 and 12 and the tube 1 each have catch elements at circumferential surfaces which are associated with one another and are oriented concentric to the optical axis, these catch elements being constructed as complementing locking elements similar to the first construction variant. These catch elements are also distributed along the surface so that there is a plurality of catch positions in the axal direction. In this case also, the quantity of catch positions per unit of length depends on the geometric size of the individual catch elements.

A stepwise simultaneous displacement of both fastening rings 11, 12 in this variant causes a change in the positions of the lenses 4, 5 in the axial direction, while the pretensioning force by which the lenses 4, 5 are held between the fastening rings 11, 12 remains constant. If one of the two fastening rings 11 and 12 is to be moved toward the other by catch steps, the pretensioning increases by a defined amount with every catch step. Conversely, the pretensioning decreases when one of the two fastening rings 11 and 12 is moved away from the other.

The substantial advantages of the invention consist in that the suggested arrangement compensates for deviations in length in the axial direction on the one hand, but, on the other hand, also permits an increase or a reduction in the pretensioning and, as is shown in the second construction variant, allows a displacement of components, wherein the pretensioning at the new location of the component is as great as that at the previous location. In addition, the invention is advantageous for large-scale manufacturing and assembly.

Figure 2:
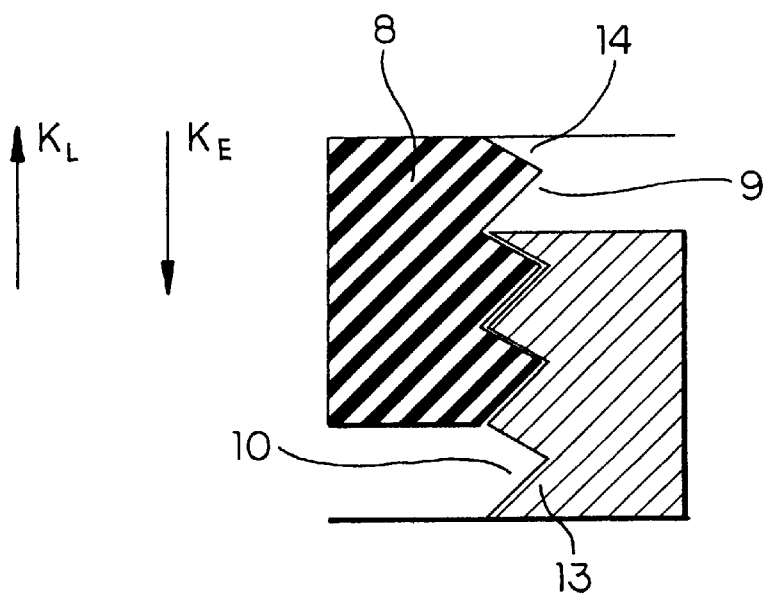
FIG. 2 an enlarged cross section of the catch elements.

FIG. 2 is an enlarged view of catch elements which are constructed with a ridge-roof-shaped cross section. The angles of inclination of the roof-shaped surfaces 13 and 14 vary in relation to the optical axis. A smaller force is required for displacement in the locking direction $K_E$ than is required for detaching the catch connection in the opposite direction $K_L$ due to the smaller inclination of the roof-shaped surface 13, since the larger inclination of the roof-shaped surface 14 must be overcome in this case.

While the foregoing description and drawings represent the present invention, it will be obvious to those skilled in the art that various changes may be made therein without departing from the spirit and scope of the present invention.

What is claimed is:

1. In an arrangement for fixing components of an optical system, which are enclosed by a common tube in which they contact a stop axially on the one hand and are held against the stop under pretensioning by a detachable fastening ring on the other hand, an improvement comprising that:

said fastening ring is made from elastic material and engages radially over an edge area of one of the components; and said fastening ring and said tube have catch elements at circumferential surfaces which are oriented concentric to an optical axis, said catch elements being constructed as complementing locking elements in such a way that the catch elements of the fastening ring engage in the catch elements at the tube under the influence of axially directed force or can be disengaged, wherein pretensioning by which the components are held is dependent on the extent to which the catch elements at the fastening ring and at the tube overlap in the axial direction.

2. The arrangement for fixing components of an optical system according to claim 1, wherein the catch elements at the fastening ring and at the tube are constructed such that their cross sections have the shape of a ridge-type roof.

3. The arrangement for fixing components of an optical system according to claim 2, wherein the angle of inclination of the ridge-roof-shaped cross sections differs relative to the optical axis so that forces required for locking in differ from those required for detaching a catch connection.

4. The arrangement for fixing components of an optical system according to claim 2, wherein the catch elements at the fastening ring and at the tube are provided so as to extend along the entire circumference.

* * * * *